United States Patent
Natori

(10) Patent No.: US 7,223,986 B2
(45) Date of Patent: May 29, 2007

(54) LASER SCANNING MICROSCOPE

(75) Inventor: Yasuaki Natori, Ina (JP)

(73) Assignee: Olympus Optical Co., Ltd., Tokyo (JP)

(*) Notice: Subject to any disclaimer, the term of this patent is extended or adjusted under 35 U.S.C. 154(b) by 245 days.

(21) Appl. No.: 10/650,062

(22) Filed: Aug. 27, 2003

(65) Prior Publication Data

US 2004/0178356 A1 Sep. 16, 2004

(30) Foreign Application Priority Data

Aug. 29, 2002 (JP) ............................. 2002-250824

(51) Int. Cl.
*G01N 21/64* (2006.01)
(52) U.S. Cl. .................... 250/458.1; 359/368; 359/385
(58) Field of Classification Search ............. 250/458.1, 250/159.1, 461.1, 461.2, 580, 586, 584; 359/368, 359/385
See application file for complete search history.

(56) References Cited

U.S. PATENT DOCUMENTS

| | | | |
|---|---|---|---|
| 4,893,886 A * | 1/1990 | Ashkin et al. ............... 359/350 |
| 5,760,951 A * | 6/1998 | Dixon et al. ................. 359/385 |
| 6,094,300 A | 7/2000 | Kashima et al. |
| 6,167,173 A * | 12/2000 | Schoeppe et al. ............. 385/33 |
| 6,429,936 B1 * | 8/2002 | Scaduto ....................... 356/417 |
| 6,437,913 B1 * | 8/2002 | Kishi .......................... 359/389 |
| 6,444,992 B1 * | 9/2002 | Kauvar et al. ........... 250/461.1 |
| 2002/0109100 A1 * | 8/2002 | Jackson et al. .......... 250/458.1 |
| 2003/0222222 A1 * | 12/2003 | Dong et al. ............... 250/458.1 |
| 2004/0031930 A1 * | 2/2004 | Wolleschensky et al. 250/458.1 |

FOREIGN PATENT DOCUMENTS

JP 2000-275529 A 10/2000

* cited by examiner

*Primary Examiner*—David Porta
*Assistant Examiner*—Faye Boosalis
(74) *Attorney, Agent, or Firm*—Frishauf, Holtz, Goodman & Chick, P.C.

(57) ABSTRACT

There is disclosed a laser scanning microscope including a first optical scanning system which scans a first laser light for observing a sample on the sample, a first light branch device which branches the light from the sample from an optical path of the first laser light, a photodetector which detects the light from the sample, separated by the first light branch device, a second optical scanning system which irradiates a specific portion on the sample with a second laser light for stimulating or operating the sample, and a wavelength selection device which is disposed between the first light branch device and photodetector and which includes a first function of transmitting a desired observation light and a second function of limiting transmission of the second laser light.

13 Claims, 6 Drawing Sheets

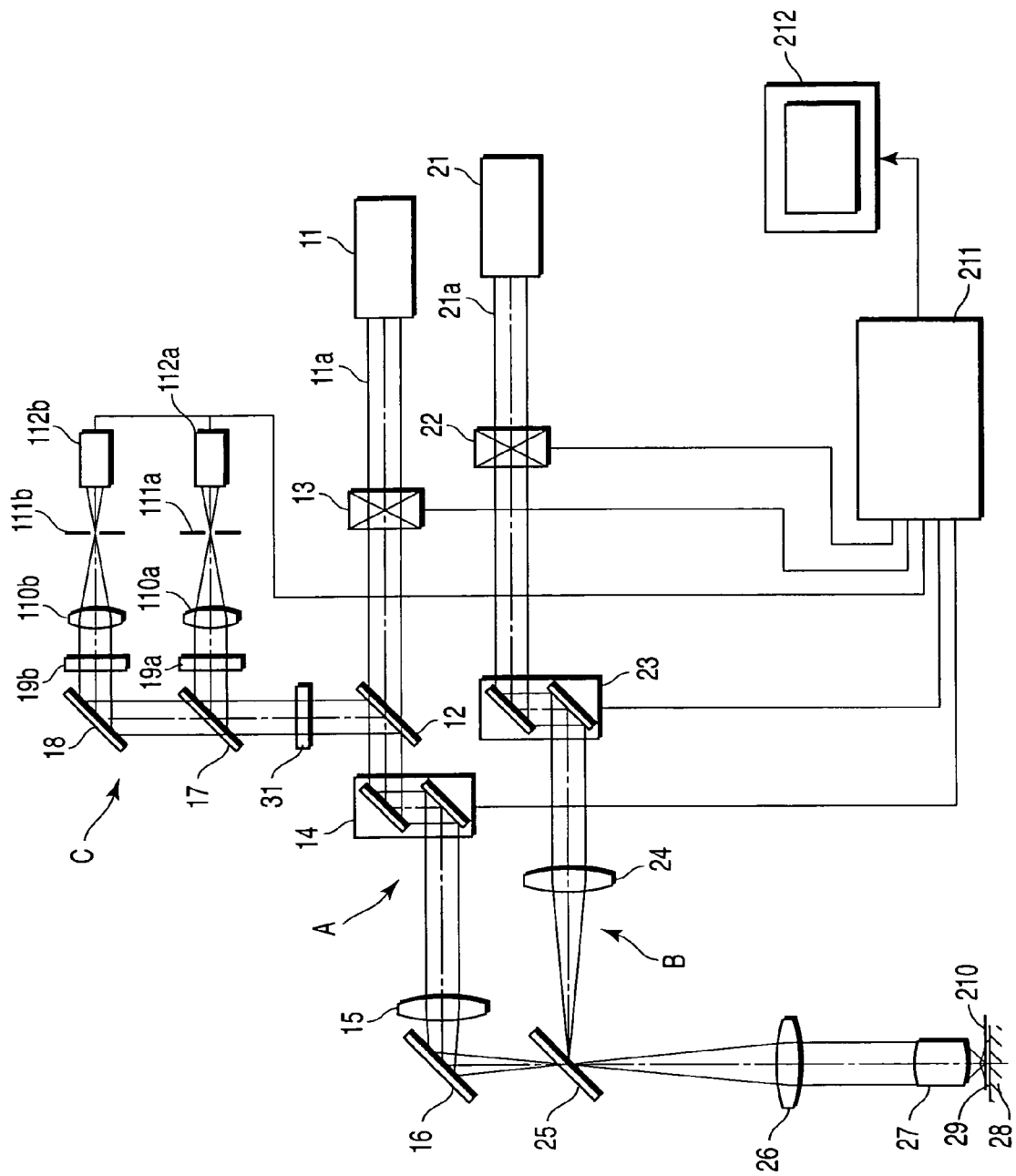
F I G. 2

LASER SCANNING MICROSCOPE

CROSS-REFERENCE TO RELATED APPLICATIONS

This application is based upon and claims the benefit of priority from the prior Japanese Patent Application No. 2002-250824, filed Aug. 29, 2002, the entire contents of which are incorporated herein by reference.

BACKGROUND OF THE INVENTION

1. Field of the Invention

The present invention relates to a laser scanning microscope for scanning a laser beam onto a sample to detect fluorescence from the sample by a photodetector.

2. Description of the Related Art

In Jpn. Pat. Appln. KOKAI Publication No. 2000-275529, a laser scanning microscope is disclosed including a first optical scanning system A for obtaining a scanned image of fluorescence from the sample and a second optical scanning system B for expressing peculiar phenomena such as cleavage of a caged reagent in a specific portion of the sample.

FIG. 1 is a diagram showing a constitution of a conventional laser scanning microscope. A sample 79 is irradiated with laser beams from the second optical scanning system B in synchronization with the scanning of the laser beams of the first optical scanning system A, and changes of the sample 79 with an elapse of time can be measured. The synchronization is carried out, when a control unit 81 controls a laser shutter 63, optical scanning unit 64, and photoelectric conversion device 70 of the first optical scanning system A, and a laser shutter 72 and optical scanning unit 73 of the second optical scanning system B.

The caged reagent and a fluorescent indicator having sensitivity to concentration of ions such as calcium ions are injected into the sample 79. The sample 79 in which the caged reagent has been injected is irradiated with the laser beams from a laser unit 71 of the second optical scanning system B. A caged group of the caged reagent in the irradiated portion is cloven, and materials enclosed inside are released. The change of an ion concentration distribution in the sample 79 by this release is measured by a fluorescent image obtained by the laser beams from a laser unit 61 of the first optical scanning system A. With the cleavage of the caged reagent or by the irradiation with the laser beams of the second laser unit 71, the fluorescent indicator of the sample 79 produces a certain degree of fluorescence. However, the control unit 81 controls an opening/closing timing of the laser shutters 63, 72 of each laser beam and a detection timing in the photoelectric conversion device 70 with the elapse of time. Therefore, a spectrum of fluorescence can be detected by a photodetector to obtain the fluorescent image without being influenced by the change of a fluorescent intensity from the fluorescent indicator with the cleavage of the caged reagent.

However, in the laser scanning microscope including first and second optical scanning systems described in the Jpn. Pat. Appln. KOKAI Publication No. 2000-275529, there is possibility that the laser beams of the second optical scanning system are detected by the photodetector of the first optical scanning system. This has left much room for improvement in obtaining a desired fluorescent image.

For example, the use of a UV pulse laser (wavelength of 351 nm) as the laser unit 71 of the second optical scanning system B for cleaving the caged reagent is considered. Since much light intensity is required for cleaving the caged reagent, a reflected light of the laser beams of the second optical scanning system from the irradiated sample 79 is also intense. A dichroic mirror 75 does not sufficiently absorb the reflected light of the UV pulse laser beams, and a slight amount of the light is transmitted through an optical path of the first optical scanning system A. However, in a dichroic mirror 62 and filters such as a laser cut filter 67 usually for use in the first optical scanning system A, that is, an optical scanning system for acquiring images, transmission capabilities with respect to a short wavelength band of the UV laser are hardly considered. The wavelength of the UV pulse laser is reflected, transmitted, and detected by the photoelectric conversion device 70, and a clear fluorescent image cannot be obtained.

Similarly, the use of an IR pulse laser (wavelength of 710 nm) as the laser unit 71 of the second optical scanning system B for cleaving the caged reagent is considered. It is to be noted that this IR pulse laser is assumed as laser capable of causing two photon excitation. Also for the IR pulse laser, the intense reflected light from the sample 79 is not sufficiently reflected by the dichroic mirror 75, and the slight amount of the light passes through the optical path of the first optical scanning system A. For the filters usually for use in the first optical scanning system A, that is, the optical scanning system for acquiring the images, a long path filter which reflects a short wavelength and transmits a long wavelength is used in many cases. For these laser cut filters, transmission characteristics in the long wavelength band of IR are not considered. Therefore, the wavelength of IR pulse laser beams, which is longer than that of the fluorescence, passes through the laser cut filter, and is detected by the photodetector. Therefore, the clear fluorescent image cannot be obtained.

Moreover, to prevent the above-described phenomenon, as described in the Jpn. Pat. Appln. KOKAI Publication No. 2000-275529, it is considered that the control unit 81, for example, shifts a timing of laser irradiation to control the first and second optical scanning systems, and influences of the laser beams of the second optical scanning system B are avoided. However, in this case, since it is necessary to simultaneously control the optical scanning system and an optical detection system at a high speed, a complicate control is required for realizing this. Furthermore, in the technique described in the Jpn. Pat. Appln. KOKAI Publication No. 2000-275529, the sample cannot be irradiated with two types of laser beams at the same time. Therefore, when the changes of the sample 79 with the elapse of time are measured, real time characteristics drop.

BRIEF SUMMARY OF THE INVENTION

According to a first aspect of the present invention, there is provided a laser scanning microscope comprising: a first optical scanning system which scans a first laser light having a spectrum in a visible range on a sample to excite fluorescence; a first dichroic mirror which separates the fluorescence from the sample from an optical path of the first laser light; a photodetector which detects the fluorescence separated by the first dichroic mirror; an emission filter which is disposed between the first dichroic mirror and photodetector to cut off the first laser light and to transmit desired fluorescence; a second optical scanning system which introduces a second laser light having the spectrum in an ultraviolet or infrared region into a specific portion on the sample; and a laser cut filter which is disposed between the first dichroic mirror and detector to limit transmission of the second laser light.

Moreover, according to another aspect of the present invention, there is provided a laser scanning microscope comprising: a first optical scanning system which scans a first laser light for observing a sample on the sample; a first light branch device which branches a light from the sample from an optical path of the first laser light; a photodetector which detects the light from the sample separated by the first light branch device; a second optical scanning system which irradiates a specific portion on the sample with a second laser light for stimulating or operating the sample; and a wavelength selection device which is disposed between the first light branch device and photodetector and which includes a first function of transmitting a desired observation light and a second function of limiting transmission of the second laser light.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram showing a laser scanning microscope according to a first embodiment of the present invention;

DETAILED DESCRIPTION OF THE INVENTION

Figure 1:
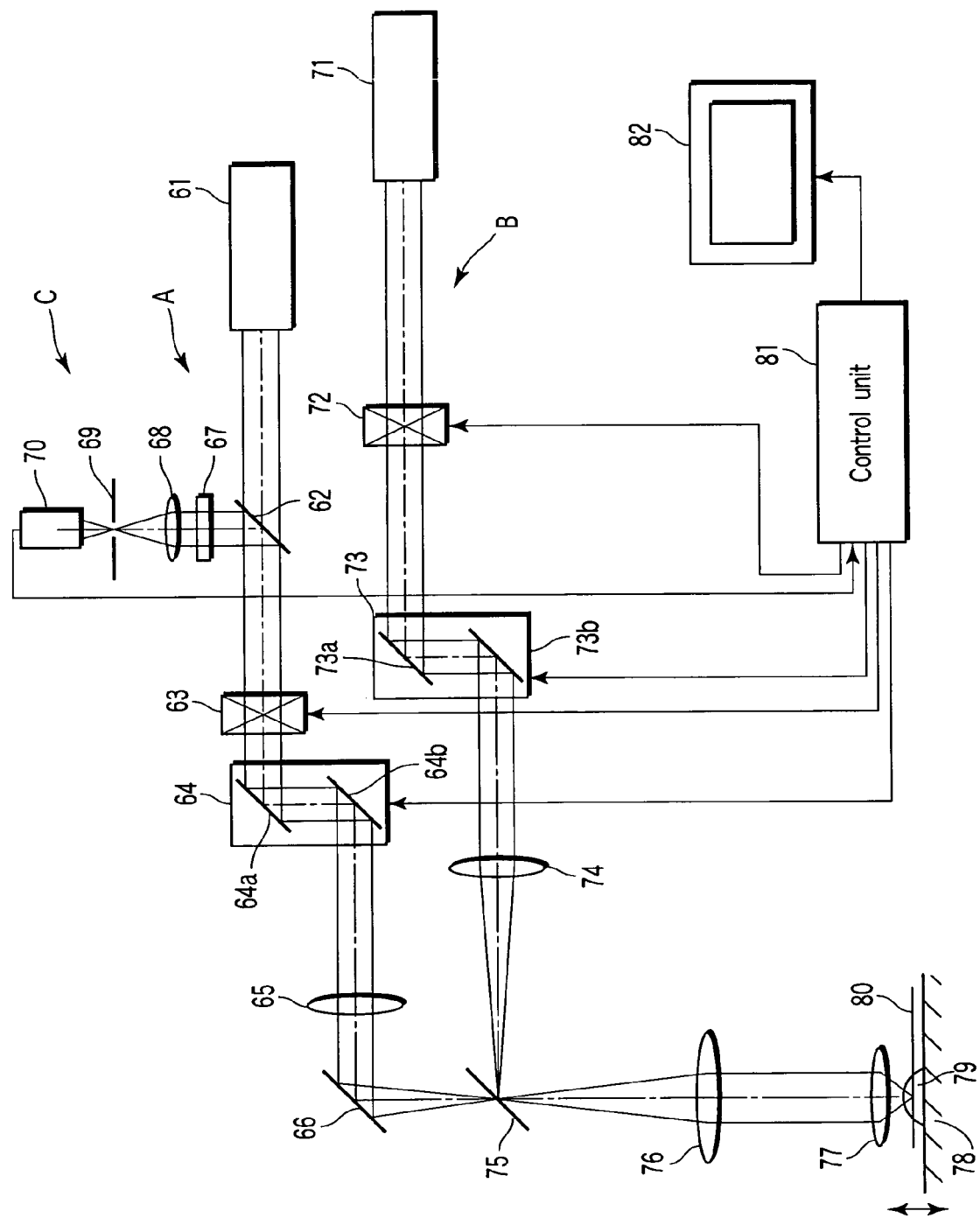
FIG. 1 is a diagram showing a conventional laser scanning microscope.

A first embodiment of the present invention will be described. FIG. 2 is a diagram of a laser scanning microscope according to the present invention.

The laser scanning microscope includes a first optical scanning system A and second optical scanning system B. The first optical scanning system A is an optical system for observation, which scans the surface of a sample 29 with a laser light 11a outputted from a first laser unit 11. The second optical scanning system B is an optical system for expressing a peculiar phenomenon in a specific portion of the sample. That is, the second optical scanning system B irradiates an arbitrary position of the sample 29 with a laser light 21a outputted from a second laser unit 21 to release a caged reagent.

The first optical scanning system A includes the first laser unit 11, dichroic mirror 12, first laser shutter 13, first optical scanning unit 14, pupil projection lens 15, and mirror 16. Furthermore, an optical detection system C is disposed in a branched optical path of the dichroic mirror 12 of the first optical scanning system A. The optical detection system C includes a laser cut filter 31, dichroic mirror 17, mirror 18, fluorescence emission filters 19a and 19b, confocal lenses 110a and 110b, confocal apertures 111a and 111b, and photoelectric conversion devices 112a and 112b.

The laser cut filter 31 has characteristics for absorbing a reflected light of the laser light 21a of the second optical scanning system B from the sample 29. A UV light is usually used to release the caged reagent. Therefore, the following laser unit is considered to be used.

(a) A UV pulse laser (wavelength of 351 nm) is used as the second laser unit 21.

(b) An IR pulse laser (wavelength of 710 nm) is used as the second laser unit 21. It is to be noted that the IR pulse laser is assumed as a laser capable of causing a two photon excitation phenomenon.

Therefore, the laser cut filter 31 has the characteristics to absorb the laser light as described above. Concretely, a filter having the characteristics shown in FIG. 3 is used.

Figure 3A:
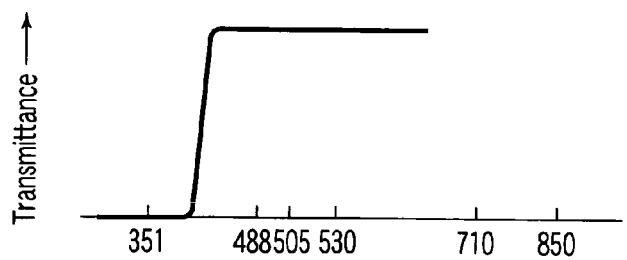
FIGS. 3A, 3B are diagrams showing transmittance wavelength characteristics of a filter.
Figure 3B:
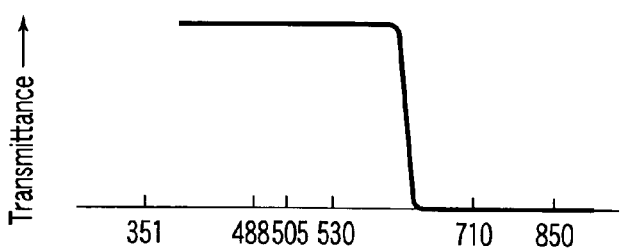

FIG. 3A is a diagram showing filter characteristics to cut off the UV pulse laser (wavelength of 351 nm), and FIG. 3B is a diagram showing the filter characteristics to cut off the IR pulse laser (wavelength of 710 nm).

The second optical scanning system B includes the second laser unit 21 for releasing the caged reagent, and a second laser shutter 22, second optical scanning unit 23, pupil projection lens 24, and dichroic mirror 25. Optical axes of the first and second optical scanning systems A, B are synthesized by the dichroic mirror 25, and introduced into an image forming lens 26 and objective lens 27. Focal positions of the pupil projection lens 15 and pupil projection lens 24 are disposed to agree with the focal position of the image forming lens 26. The sample 29 is laid on a stage 28.

Here, a supposed combination of the first laser unit 11 and second laser unit 21, and the characteristics of the dichroic mirror 25 which agree with conditions will be described hereinafter.

Figure 4A:
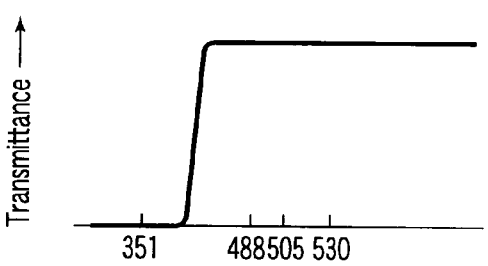
FIGS. 4A, 4B, 4C are diagrams showing the transmittance wavelength characteristics of a dichroic mirror.

When a visible continuous laser (wavelength of 488 nm) is used in the first laser unit 11, and the UV pulse laser (wavelength of 351 nm) is used in the second laser unit 21, for transmittance wavelength characteristics of the dichroic mirror 25, as shown in FIG. 4A, the visible continuous laser (wavelength of 488 nm) and fluorescence (wavelength of 530 nm) are transmitted, and the UV pulse laser (wavelength of 351 nm) is reflected.

Figure 4B:
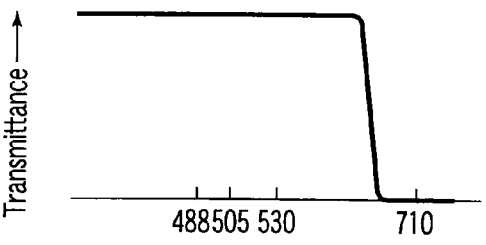

When the visible continuous laser (wavelength of 488 nm) is used in the first laser unit 11, and the IR pulse laser (wavelength of 710 nm) is used in the second laser unit 21, for the transmittance wavelength characteristics of the dichroic mirror 25, as shown in FIG. 4B, the dichroic mirror 25 transmits the visible continuous laser (wavelength of 488 nm) and fluorescence (wavelength of 530 nm) and reflects the IR pulse laser (wavelength of 710 nm).

Figure 4C:
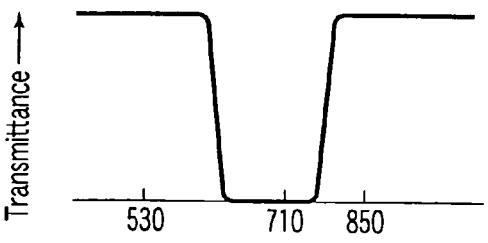

When the IR pulse laser (wavelength of 850 nm) is used in the first laser unit 11, and the IR pulse laser (wavelength of 710 nm) is used in the second laser unit 21, for the transmittance wavelength characteristics of the dichroic mirror 25, as shown in FIG. 4C, the IR pulse laser (wavelength of 850 nm) and fluorescence having a wavelength of 530 nm are transmitted, and the IR pulse laser (wavelength of 710 nm) is reflected.

It is to be noted that the IR pulse laser for use herein is a laser capable of causing a two photon excitation phenomenon.

The first laser shutter 13, second laser shutter 22, first optical scanning unit 14, second optical scanning unit 23, and photoelectric conversion devices 112a and 112b are connected to a control unit 211. The control unit 211 is connected to a CRT display 212. As described later, the control unit 211 synchronizes the irradiation of the sample 29 with the laser light from the second optical scanning system B with the scanning of the first optical scanning system A.

Next, a function of the laser scanning microscope will be described. The laser light 11a from the first laser unit 11 passes, when the first laser shutter 13 controlled to open/close by the control unit 211 is in an opened state. Subsequently, the laser light 11a is guided into the first optical scanning unit 14, and controlled by the control unit 211 to be scanned in an arbitrary direction. The laser light 11a is further converged onto a section 210 of the sample 29 via the pupil projection lens 15, mirror 16, dichroic mirror 25, image forming lens 26, and objective lens 27 to two-dimensionally scan inside the section 210 of the sample.

A fluorescent indicator (e.g., fluo-3, excitation wavelength of 488 m, fluorescent wavelength of 530 nm) excited by the wavelength of the first laser unit 11 is injected in the sample 29. When the section 210 of the sample is scanned by the laser light, the fluorescent indicator is excited to generate the fluorescence. The fluorescence incident upon the objective lens 27 travels in an opposite direction in the same optical path as that of the laser light, and is guided into the objective lens 27, image forming lens 26, and dichroic mirror 12. The dichroic mirror 12 includes characteristics to reflect the light which has a wavelength longer than that of the laser light 11a from the first laser unit 11. Therefore, the fluorescence is accordingly reflected by the dichroic mirror 12, and introduced into the optical detection system C.

When the sample 29 is multiple-dyed in the optical detection system C, the fluorescence transmitted through the laser cut filter 31 is split into the fluorescence having each wavelength by the dichroic mirror 17. Among the split lights, the light having the specific wavelength passes through the fluorescence emission filters 19a and 19b, and is focused by the confocal lenses 110a and 110b. Moreover, only the light from the section 210 of the sample is incident upon the photoelectric conversion devices 112a and 112b by the confocal apertures 111a and 111b disposed in positions optically conjugated with the section 210 of the sample.

Output signals from the photoelectric conversion devices 112a and 112b are guided into the control unit 211. The output signals are converted to digital signals in synchronization with scanning control, and displayed on a screen of the CRT display 212 in accordance with a scanned position. The displayed image indicates the fluorescent image which is a two-dimensional distribution of a fluorescent luminance in the section 210 of the sample, that is, the distribution in the section 210 having an ion concentration.

On the other hand, the laser light 21a from the second laser unit 21 passes, when the second laser shutter 22 controlled to open/close by the control unit 211 is in the opened state. The laser light 21a proceeds on the same optical axis as that of the laser light 11a from the first optical scanning system A via the second optical scanning unit 23, pupil projection lens 24, and dichroic mirror 25. Moreover, the laser light 21a passes through the image forming lens 26 and objective lens 27 to irradiate the section 210 of the sample 29. At this time, since the control unit 211 controls the second optical scanning unit 23, an irradiation position in the section 210 can be selected independently of the scanned position of the first optical scanning system A.

The sample 29 in which the caged reagent has been injected is irradiated with the laser light 21a from the second laser unit 21. Then, the caged group of the caged reagent of the irradiated portion is cloven, and substances enclosed inside are released. The change of the ion concentration distribution in the sample 29 by the release can be measured by the fluorescent image obtained by the first optical scanning system A.

At this time, the reflected light including the laser light 21a from the second laser unit 21 reflected on the sample 29 proceeds in the same optical path as that of the fluorescence generated on the section 210 of the sample 29. Several % of the reflected light including the laser light 21a which has reached the dichroic mirror 25 passes through the dichroic mirror 25 and is introduced into the optical path of the first optical scanning system A. The reflected light including the second laser light guided into the first optical scanning system A passes through the mirror 16, pupil projection lens 15, and optical scanning unit 14, and is reflected by the dichroic mirror 12, and guided into the optical path of the optical detection system.

The reflected light including the laser light 21a reflected by the dichroic mirror 12 is absorbed by the laser cut filter 31 which is disposed on the optical path of the optical detection system C beforehand and which has characteristics to absorb the laser light 21a. Therefore, only the fluorescence passes through the laser cut filter 31, and is detected by the photoelectric conversion devices 112a and 112b.

Here, transmission characteristics of the laser cut filter 31 for use in the present embodiment will be described.

With respect to the intensity of the laser light 21a from the second optical scanning system B as an excitation laser light with which the sample 29 is irradiated, the intensity of the fluorescence generated from the sample 29 is very weak. Therefore, even when the laser light 21a reflected by the sample 29 is reflected by the sample or an optical system midway and accordingly attenuated, the intensity becomes 1000 times or more that of the fluorescence generated from the sample 29 and directed toward the devices 112a and 112b. Therefore, in order to clearly acquire the fluorescent image without being influenced by the reflected laser light 21a, as laser cut filter characteristics for transmitting the fluorescence, the transmittance of the reflected laser light 21a needs to be at least 0.01% or less.

Additionally, in order to realize the characteristics, an interference filter using a multilayered film coating is used. For the interference filter, a large number of layers different in refractive index and film thickness are superimposed on one another, and the interference filter controls the transmittance by optical interference. However, for the interference filter, it is difficult to realize flat transmittance characteristics with respect to the wavelength band. Therefore, usually, targeted transmission wavelength and cut-off wavelength are set, and the filter is manufactured so as to obtain desired characteristics with the wavelength. As a filter which has actually heretofore been manufactured as the laser cut filter for selecting a fluorescent wavelength, it has been general to set the transmittance to 0.01% or less with respect to only an excitation wavelength corresponding to the fluorescence.

That is, the conventional laser cut filter is a filter having "a function of extracting the fluorescence", and is assumed not to include a function of cutting off the "second laser light" in a case where the second optical scanning system is disposed. The laser cut filter 31 for use in the present embodiment further includes this function.

Figure 5A:
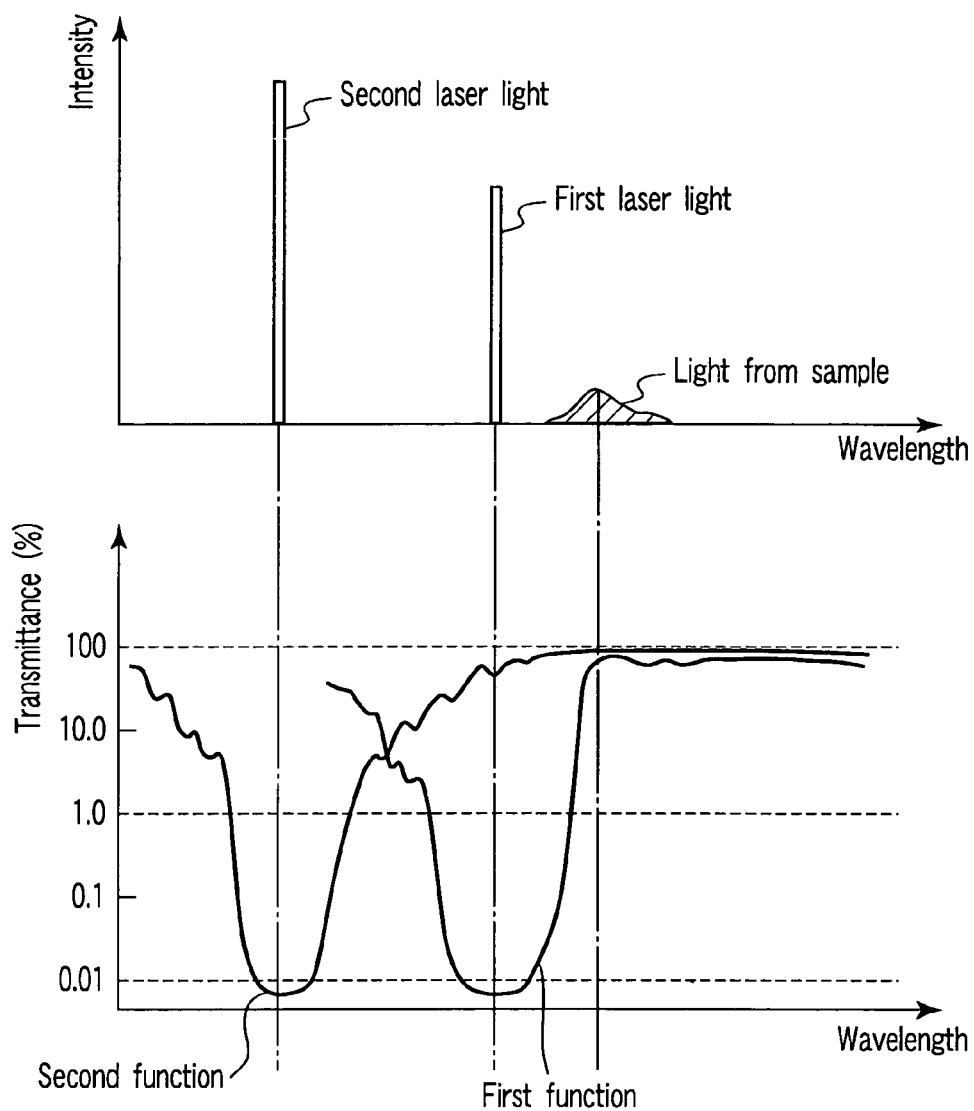
FIGS. 5A, 5B are concept diagrams showing characteristics and constitution of a laser cut filter.

FIG. 5A is an explanatory view of the characteristics of the laser cut filter according to the present embodiment.

In FIG. 5A, the first laser light is represented as the visible continuous laser (wavelength of 488 nm), the second laser light is represented as the UV pulse laser (wavelength of 351 nm), and the light from the sample is represented as the fluorescence from the sample (wavelength of 530 nm).

An upper part of FIG. 5A shows an intensity distribution of the first laser light, second laser light, and the light from the sample. As shown in this figure, the intensity of the second laser light is higher than that of the first laser light in many cases. This is because the second laser light is used for a purpose of exciting or operating the sample. It is seen from this that necessity of securely cutting off the second laser light rather than the first laser light is high.

A lower part of FIG. 5A shows a concept of the transmission characteristics of the laser cut filter according to the present embodiment.

As described above, the laser cut filter according to the present embodiment includes two functions. That is, the filter includes the transmission characteristics for realizing a first function which is a "function of extracting the fluorescence" and a second function which is a "function of cutting off the second laser light". With thee two functions, it is possible to obtain a clear fluorescent image.

Figure 5B:
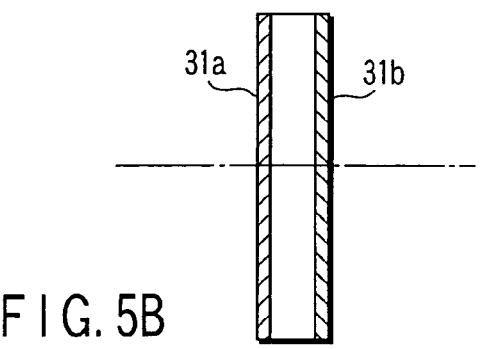

In order to realize the laser cut filter of the present embodiment, as shown in FIG. 2, the fluorescence emission filters 19a and 19b including the "function of extracting the fluorescence" (first function) and the laser cut filter 31 including the "function of cutting off the second laser light" (second function) are disposed. Moreover, as shown in FIG. 5B, filter films 31a, 32a including the respective functions may be formed on opposite surfaces of one glass. The filters shown in FIG. 5B may be used instead of the filters 19a and 19b of FIG. 2. At this time, the filter 31 is not required.

When the laser cut filter 31 including the above-described transmission characteristics is used and incorporated in the optical detection system C in this manner, the laser light 21a included in the reflected light from the sample 29 can securely be removed, and the clear fluorescent image is obtained. The simultaneous irradiation with the first and second laser lights 11a and 21a is also possible. Furthermore, when the sample 29 is multiple-dyed, as shown in FIG. 2, the laser cut filter 31 may be disposed in a common optical path of the optical detection system C, and therefore the system can easily be constituted.

Figure 6:
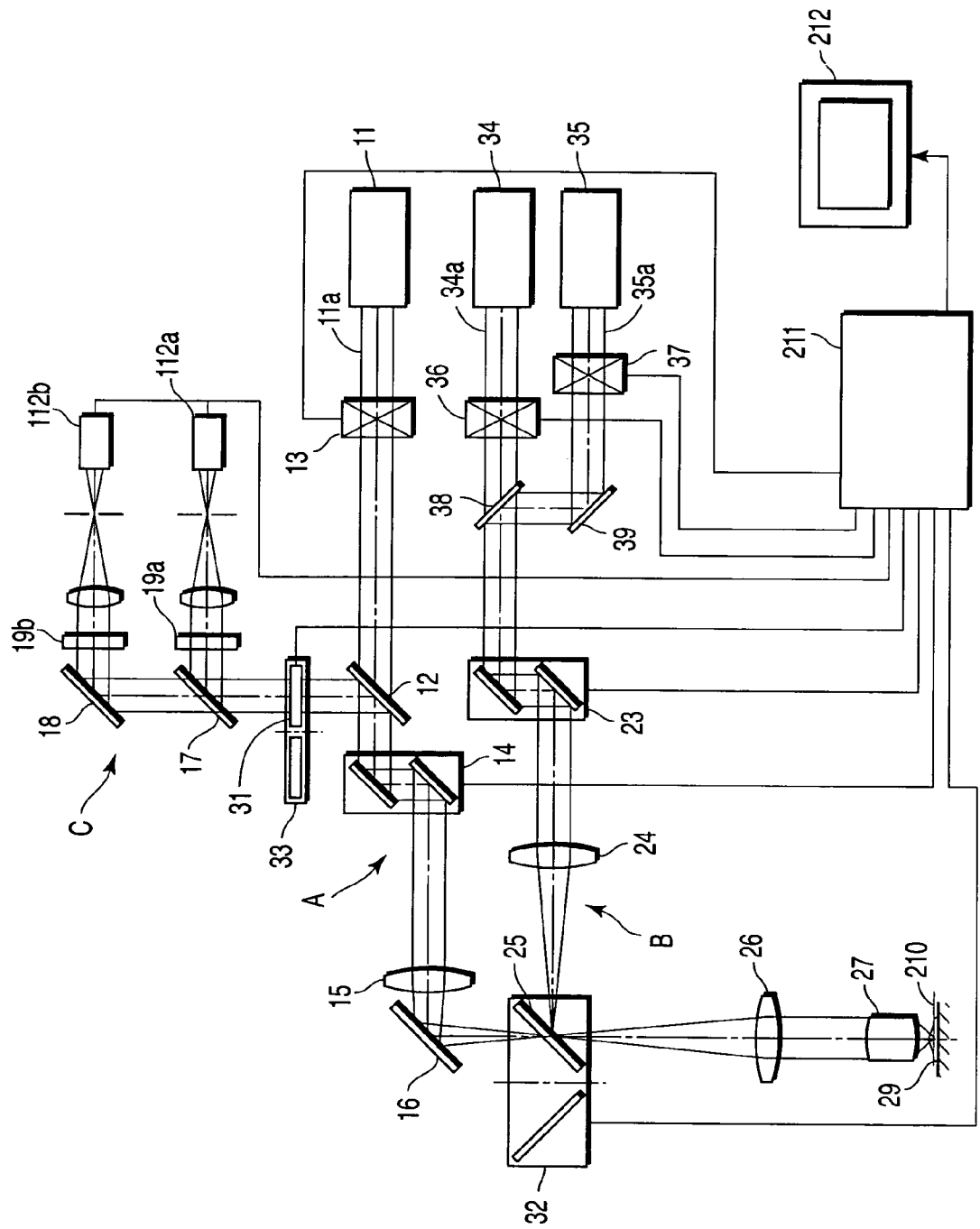
FIG. 6 is a diagram of the laser scanning microscope according to another embodiment.

A second embodiment of the present invention will be described. FIG. 6 is a diagram of the laser scanning microscope according to the present invention. The same components as those of the first embodiment are denoted with the same numerals, and detailed description thereof is omitted.

In the second embodiment, a UV pulse laser 34 and an IR pulse laser 35 whose wavelength can be varied and which can cause the two photon excitation phenomenon are used in the laser of the second optical scanning system B. Moreover, these lasers 34, 35 can be selected and used by controlling the opening/closing of laser shutters 36 and 37. The dichroic mirror 25 is disposed in a position where the optical axis of the laser light 11a from the first optical scanning system A and that of laser light 34a or 35a from the second optical scanning system B are synthesized. At least one dichroic mirror 25 is disposed in an electromotive turret 32 in which a plurality of dichroic mirrors can be disposed.

Further to cut off the laser light 34a or 35a from the laser unit of the second optical scanning system B, the laser cut filter 31 is disposed on the optical path of the optical detection system C. At least one laser cut filter 31 is disposed in an electromotive turret 33 in which a plurality of filters can be disposed.

It is to be noted that the electromotive turrets 32 and 33 are usually of a rotary type, but may be of a slider type if necessary.

Moreover, the electromotive turrets 32 and 33 and laser shutters 36, 37 are connected to the control unit 211, and can be controlled by the control unit 211.

The function of the laser scanning microscope constituted in this manner will be described. The UV pulse laser 34 is used as the laser unit of the second optical scanning system B. The laser light 11a from the first laser unit 11 of the first optical scanning system A, and the UV pulse laser light 34a outputted from the laser unit of the second optical scanning system B pass through the respective optical devices in the same manner as in the first embodiment. Moreover, the optical axes of the laser light 11a from the first optical scanning system A and the UV pulse laser light 34a from the second optical scanning system B are synthesized by the dichroic mirror 25. The dichroic mirror 25 includes characteristics to transmit the laser light 11a from the first optical scanning system A and to reflect the UV pulse laser light 34a which is the laser light from the second optical scanning system B. The dichroic mirror 25 is disposed on the optical path by the electromotive turret 32 which operates in conjunction with the opening/closing operation of the laser shutter 36.

The respective laser lights from the first and second laser units synthesized by the dichroic mirror 25 pass through the image forming lens 26 and objective lens 27, and are focused on the section 210 of the sample 29 in the same manner as in the first embodiment. The caged reagent is released by the UV pulse laser light 34a, and the fluorescent indicator is excited by the laser light 11a from the first optical scanning system A to generate the fluorescence.

The fluorescence generated from the sample 29 and the UV pulse laser light 34a which is the reflected light from the sample travel in an opposite direction through the optical path of the first optical scanning system A, and the fluorescence and the reflected light of the UV pulse laser light 34a are introduced into the optical detection system C via the dichroic mirror 12.

Among the fluorescence and UV pulse laser light 34a introduced into the optical detection system C, the fluorescence passes through the laser cut filter 31, and the UV pulse laser light is absorbed by the laser cut filter 31. It is to be noted that the electromotive turret 33 operates in conjunction with the opening/closing operation of the laser shutter 36, and the laser cut filter 31 including the transmission characteristics to absorb the UV pulse laser light is disposed beforehand on the optical path.

The fluorescence which has passed through the laser cut filter 31 passes through the respective optical devices in the same manner as in the first embodiment. Moreover, the fluorescence is detected by the photoelectric conversion devices 112a and 112b. The detection signal is processed by the control unit 211, and subsequently displayed on the CRT display 212.

On the other hand, in order to release the caged reagent or to light-discolor the sample in which protein (e.g., YFP) is expressed, the IR pulse laser 35 is sometimes used as the laser light of the second optical scanning system B. In this case, the dichroic mirror 25 for synthesizing the optical axes of the laser light from the first optical scanning system A and the IR pulse laser light 35a from the second optical scanning system B includes the transmission characteristics to transmit the laser light 11a from the first optical scanning system A and reflect the IR pulse laser light 35a. Moreover, in conjunction with the opening/closing operation of the laser shutter 37, the electromotive turret 32 brings the dichroic mirror 25 onto the optical path beforehand.

Moreover, also in the optical detection system C, the laser cut filter 31 includes the transmission characteristics to transmit the fluorescence and absorb the IR pulse laser light 35a which is the reflected light. Furthermore, the electromotive turret 33 brings the laser cut filter 31 onto the optical path beforehand in conjunction with the opening/closing operation of the laser shutter 37.

In this manner, in the second embodiment, the dichroic mirror 25 for synthesizing the optical axes of the laser lights from the first and second optical scanning systems A and B is disposed on the electromotive turret. Furthermore, in the optical detection system C, the laser cut filter 31 for absorbing the laser light of the second optical scanning system B which is the reflected light from the sample 29 is disposed in the electromotive turret 33. Moreover, the electromotive turrets 32 and 33 are operated in conjunction with the opening/closing operation of the laser shutters 36 and 37. Accordingly, there can be provided a system in which either the UV pulse laser 34 or IR pulse laser 35 can be selected and used as the laser unit of the second optical scanning system B for use in releasing the caged reagent.

Moreover, when a manual turret is used instead of the electromotive turrets 32 and 33, a system including the similar function can inexpensively be provided.

Figure 7:
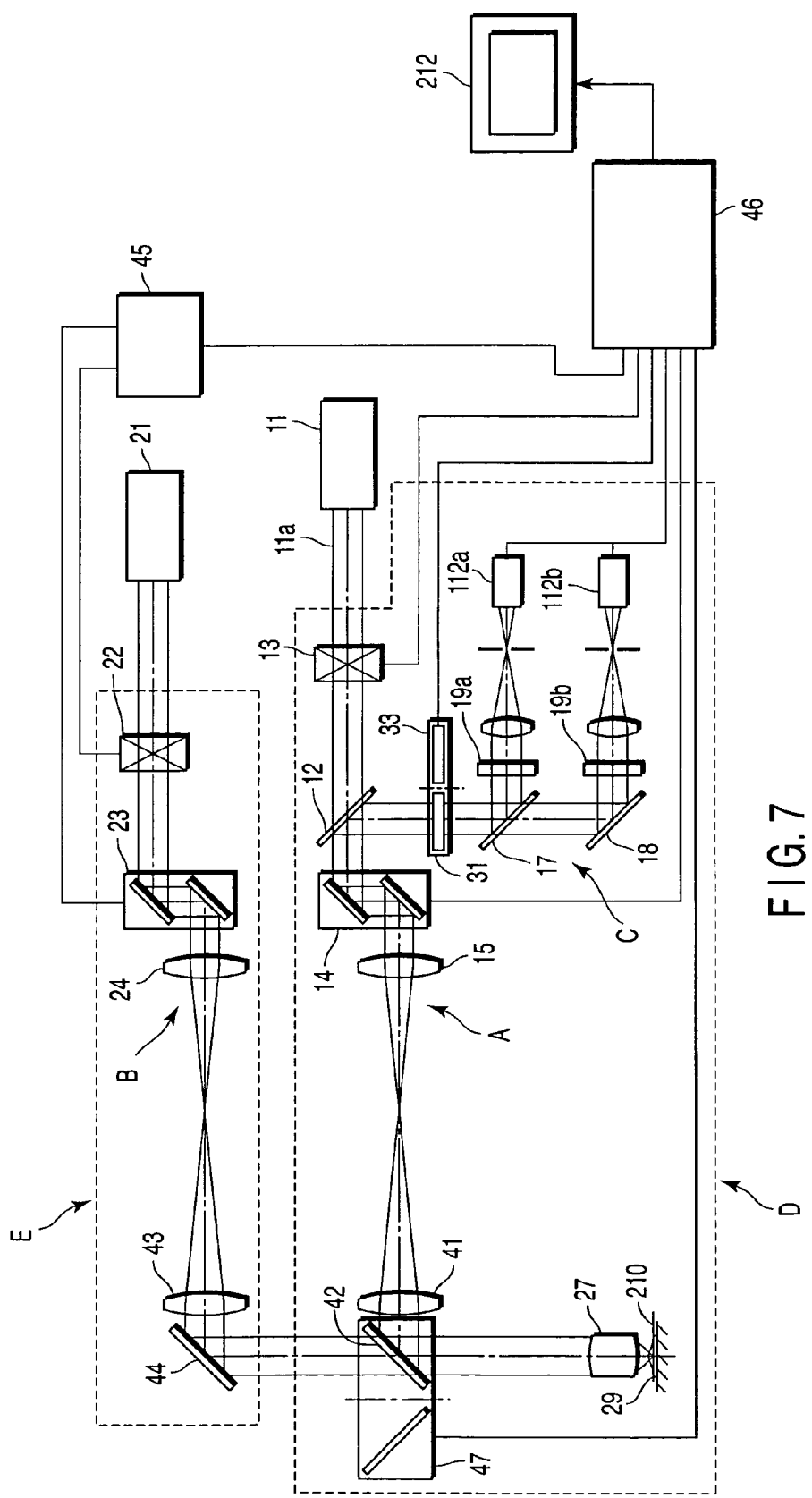
FIG. 7 is a diagram of the laser scanning microscope according to another embodiment.

A third embodiment of the present invention will be described. FIG. 7 is a diagram of the laser scanning microscope according to the present invention. The same components as those of the first and second embodiments are denoted with the same reference numerals and the detailed description is omitted.

The laser scanning microscope of the present embodiment includes a constitution in which an image forming lens 41 of the first optical scanning system A and an image forming lens 43 of the second optical scanning system B for observation are independently disposed, and the objective lens 27 is shared.

The first optical scanning system A is constituted as a laser scanning microscope D. The first optical scanning system A is constituted of the first laser unit 11, the first laser shutter 13, the dichroic mirror 12, the first optical scanning unit 14, the pupil projection lens 15, the image forming lens 41, a dichroic mirror 42, and the objective lens 27. At least one dichroic mirror 42 is disposed in an electromotive turret 47 in which a plurality of dichroic mirrors can be disposed. Furthermore, the optical detection system C is disposed on the branched optical path of the dichroic mirror 12 of the first optical scanning system A. Since the optical detection system C is the same as that of the second embodiment, the description is omitted.

The dichroic mirror 42 disposed in the electromotive turret 47 of the first optical scanning system A includes characteristics to reflect the wavelength of the laser light from the first optical scanning system A and the light having the long wavelength and to transmit the laser light from the second optical scanning system B.

The second optical scanning system B is constituted as an illuminative light introduction apparatus E. The second optical scanning system B is constituted of the second laser unit 21, second laser shutter 22, second optical scanning unit 23, pupil projection lens 24, and image forming lens 43, and a mirror 44.

It is to be noted that the second optical scanning unit 23 may be omitted to constitute the second optical scanning system B.

The second laser shutter 22 and second optical scanning unit 23 are controlled by a second control unit 45. The second control unit 45 is connected to a first control unit 46 for controlling synchronization with the first optical scanning system A.

It is to be noted that the second control unit 45 is not necessarily required. The second laser shutter 22 and second optical scanning unit 23 may also directly be connected to the first control unit 46.

Moreover, in the present embodiment, the laser scanning microscope D and illuminative light introduction apparatus E are constituted as independent units, and are structured to be attachable/detachable, for example, by a dovetail structure or bolt fastening.

Next, the function of the laser scanning microscope constituted in this manner will be described. The laser light 11a emitted from the first laser unit 11 of the first optical scanning system A passes through the respective optical devices of the first optical scanning system A, and is formed into a parallel light by the image forming lens 41. Moreover, the laser light 11a is reflected by the dichroic mirror 42 and focused by the objective lens 27 to scan on the section 210 of the sample 29. The fluorescence from the section 210 of the sample 29 travels forward in an optical path similar to that described in the first embodiment, and is detected by the optical detection system C.

On the other hand, the laser light 21a emitted from the laser unit 21 of the second optical scanning system B passes through the respective optical devices of the second optical scanning system B, and is formed into the parallel light by the image forming lens 43. Moreover, the laser light 21a is reflected by the mirror 44 and synthesized with the optical axis from the first optical scanning system A via the dichroic mirror 42. Furthermore, the laser light 21a is focused by the objective lens 27 to irradiate the section 210 of the sample 29.

When the first control unit 46 controls the second control unit 45 and second optical scanning unit 23, an irradiation position and range by the second optical scanning system B can be selected independently of a scanning position and range of the first optical scanning unit 14.

As described above, in the third embodiment, the first optical scanning system A includes the image forming lens 41, and the second optical scanning system B includes the image forming lens 43. Therefore, the laser light which has passed through the image forming lenses 41, 43 forms the parallel light, and the optical axis of the first optical scanning system A can easily be matched with that of the second optical scanning system B.

That is, a luminous flux of a connecting portion of the laser scanning microscope D including the first optical scanning system A with respect to the illuminative light introduction apparatus E including the second optical scanning system B is the parallel light. Therefore, optical axis alignment is facilitated in connecting the laser scanning microscope D to the illuminative light introduction apparatus E.

Moreover, the first optical scanning system A is constituted as the laser scanning microscope D, and the second optical scanning system B can be constituted as the illuminative light introduction apparatus E. Therefore, since the respective apparatuses can be constituted as different appropriates, the illuminative light introduction apparatus E can be provided as an apparatus for upgrading the system of the laser scanning microscope D.

Furthermore, when the illuminative light introduction apparatus E includes the constitution without including the optical scanning unit 23 of the second optical scanning system B, the apparatus can be provided as an inexpensive apparatus which is easily controlled.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A laser scanning microscope comprising:
a first optical scanning system which scans a first laser light for observing a sample on the sample;
a first light branch device which separates a light from the sample from an optical path of the first laser light;
at least one photodetector which detects the light from the sample separated by the first light branch device;
a second optical scanning system which irradiates a specific portion on the sample with a second laser light for stimulating or operating the sample; and
a wavelength selection device which is disposed between the first light branch device and the photodetector and which has a first function of transmitting a desired observation light and a second function of limiting transmission of the second laser light;
wherein the second optical scanning system is attachable and detachable with respect to a main body of the laser scanning microscope that includes the first optical scanning system.

2. A laser scanning microscope comprising:
a first optical scanning system which scans a first laser light for observing a sample on the sample;
a first light branch device which separates a light from the sample from an optical path of the first laser light;
at least one photodetector which detects the light from the sample separated by the first light branch device;
a second optical scanning system which irradiates a specific portion on the sample with a second laser light for stimulating or operating the sample; and
a wavelength selection device which is disposed between the first light branch device and the photodetector and which has a first function of transmitting a desired observation light and a second function of limiting transmission of the second laser light;
wherein the wavelength selection device comprises an interference filter.

3. The laser scanning microscope according to claim 1, wherein the desired observation light is a fluorescence excited by the first laser light.

4. The laser scanning microscope according to claim 1, wherein a transmittance of the second laser light by the wavelength selection device is not more than 0.01%.

5. The laser scanning microscope according to claim 1, wherein the wavelength selection device comprises:
at least one first interference filter which performs the first function; and
at least one second interference filter which performs the second function.

6. The laser scanning microscope according to claim 5, further comprising:
a wavelength change section which changes a wavelength of the second laser light; and
a filter change section which changes the second interference filter in accordance with the wavelength of the second laser light.

7. The laser scanning microscope according to claim 5, wherein:
the at least one photodetector comprises a plurality of photodetectors and the at least one first interference filter comprises a plurality of first interference filters;
a second light branch device which splits the light from the sample toward the photodetectors is disposed between the first light branch device and the photodetectors;
the second interference filter is disposed between the first and second light branch devices; and
the first interference filters are disposed between the respective photodetectors and the second light branch device.

8. A laser scanning microscope comprising:
a first optical scanning system which scans a first laser light for observing a sample on the sample;
a first light branch device which separates a light from the sample from an optical path of the first laser light;
at least one photodetector which detects the light from the sample separated by the first light branch device;
a second optical scanning system which irradiates a specific portion on the sample with a second laser light for stimulating or operating the sample; and
a wavelength selection device which is disposed between the first light branch device and the photodetector and which has a first function of transmitting a desired observation light and a second function of limiting transmission of the second laser light;
wherein the wavelength selection device comprises:
at least one first interference filter which performs the first function; and
at least one second interference filter which performs the second function.

9. The laser scanning microscope according to claim 8, wherein:
the at least one photodetector comprises a plurality of photodetectors and the at least one first interference filter comprises a plurality of first interference filters;
a second light branch device which splits the light from the sample toward the photodetectors is disposed between the first light branch device and the photodetectors;
the second interference filter is disposed between the first and second light branch devices; and
the first interference filters are disposed between the respective photodetectors and the second light branch device.

10. The laser scanning microscope according to claim 8, further comprising:
a wavelength change section which changes a wavelength of the second laser light; and
a filter change section which changes the second interference filter in accordance with the wavelength of the second laser light.

11. The laser scanning microscope according to claim 8, wherein a transmittance of the second laser light by the wavelength selection device is not more than 0.01%.

12. The laser scanning microscope according to claim 8, wherein the second laser light is an ultraviolet or infrared light.

13. The laser scanning microscope according to claim 8, wherein the desired observation light is a fluorescence excited by the first laser light.

* * * * *